(12) United States Patent
Matsumoto (10) Patent No.: US 7,847,856 B2
(45) Date of Patent: Dec. 7, 2010

(54) DIGITAL CAMERA

(75) Inventor: Hisayuki Matsumoto, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 832 days.

(21) Appl. No.: 11/823,051

(22) Filed: Jun. 26, 2007

(65) Prior Publication Data

US 2008/0007644 A1 Jan. 10, 2008

(30) Foreign Application Priority Data

Jul. 6, 2006 (JP) ............... 2006-187034

(51) Int. Cl.
*H04N 5/232* (2006.01)
*G03B 13/00* (2006.01)
*G03B 17/00* (2006.01)

(52) U.S. Cl. .................. 348/357; 348/345; 396/82

(58) Field of Classification Search ......... 348/345–347, 348/349, 353–354, 357, 360; 396/79–80, 396/82, 91, 104
See application file for complete search history.

(56) References Cited

U.S. PATENT DOCUMENTS

| | | | |
|---|---|---|---|
| 5,877,811 A * | 3/1999 | Iijima et al. ............. | 348/375 |
| 6,577,343 B2 * | 6/2003 | Ohkawara ................ | 348/347 |
| 6,798,989 B2 * | 9/2004 | Higuma ................... | 396/135 |
| 7,006,139 B2 * | 2/2006 | Ohkawara ................ | 348/347 |
| 7,187,857 B2 * | 3/2007 | Okawara .................. | 396/79 |
| 7,515,199 B2 * | 4/2009 | Kawai et al. ............. | 348/347 |
| 7,711,260 B2 * | 5/2010 | Ide et al. ................. | 396/91 |
| 2001/0012074 A1* | 8/2001 | Ohkawara ................ | 348/358 |
| 2004/0036796 A1* | 2/2004 | Higuma ................... | 348/357 |
| 2005/0168622 A1* | 8/2005 | Kawai et al. ............. | 348/360 |
| 2006/0198624 A1* | 9/2006 | Ono et al. ................ | 396/133 |

FOREIGN PATENT DOCUMENTS

| | | |
|---|---|---|
| JP | 6-6660 A | 1/1994 |
| JP | 6-181532 A | 6/1994 |
| JP | 8-223469 A | 8/1996 |

* cited by examiner

*Primary Examiner*—Kelly L Jerabek
(74) *Attorney, Agent, or Firm*—Holtz, Holtz, Goodman & Chick, PC (57) ABSTRACT

The present invention discloses a digital camera having a camera body and a lens unit removably mounted on the camera body, in which the camera body calculates, based on information related to the lens unit, an optimum moving speed as an optimum speed for moving the lens unit upon causing the lens unit to perform focusing by an imager AF method (hill-climbing method).

8 Claims, 6 Drawing Sheets

DIGITAL CAMERA

CROSS-REFERENCE TO RELATED APPLICATION

This application is based upon and claims the benefit of priority from prior Japanese Patent Application No. 2006-187034, filed on Jul. 6, 2006, the entire contents of which are incorporated herein by reference.

BACKGROUND OF THE INVENTION

1. Field of the Invention

The present invention relates to a digital camera, and more particularly, to the improvement of a focusing function in the digital camera.

2. Description of the Related Art

A wide variety of interchangeable lenses have been available for lens-interchangeable cameras capable of changing photographing lenses since film cameras were mainstream. Those interchangeable lenses have been designed with the assumption that the AF (focus detection) mechanism provided integrally with the camera body would support a TTL phase-difference AF system (hereinafter referred to as "TTL phase-difference AF").

Conventionally, a so-called imager AF system (hereinafter referred to as "imager AF") has also been frequently employed as well as the TTL phase-difference AF. The imager AF is an AF system for calculating a focus evaluation value representing the acutance of an image from image data output from an image pickup device for capturing a subject image while scanning the photographing lens, i.e., while changing the position of a focusing lens in the photographing lens in an optical axis direction to determine a lens position at which the focus evaluation value becomes the maximum value. To be more specific, in the imager AF, the photographing lens is scanned to determine a lens position at which high frequency components of an image signal from the image pickup device take the maximum value. This imager AF is also called hill-climbing AF or contrast AF. The imager AF is the mainstream AF system for compact digital cameras and video camcorders.

Now that digital cameras are mainstream, it is desired that the interchangeable lenses can be used for the digital cameras. In case of existing lens-interchangeable cameras, for example, only for digital single-lens reflex cameras, the dominant AF system is the TTL phase-difference AF, and hence the interchangeable lenses are usable. However, even if the AF system of the camera body is the imager AF, it is still desired that the interchangeable lenses be usable. In this case, making the existing interchangeable lenses usable brings significant merits to users even though some restrictions are required for actual use.

There are conventionally known a wide variety of lens-interchangeable cameras employing the imager AF as their AF system. For example, all of cameras disclosed in Japanese Patent Application Laid-Open Nos. 06-6660, 06-181532, and 08-223469 are lens-interchangeable cameras employing the imager AF as their AF system.

However, if interchangeable lenses designed to support conventional TTL phase-difference AF are used for these lens-interchangeable cameras employing the imager AF as their AF system, typified by those disclosed in Japanese Patent Application Laid-Open Nos. 06-6660, 06-181532, and 08-223469, there arises a problem that a sufficient focusing speed cannot obtained. This problem will be described below.

In the TTL phase-difference AF, the photographing lens is moved by an amount of lens travel corresponding to a detected defocus amount of the photographing lens to achieve focusing of the lens. In other words, it is already known how far to move the photographing lens at the start of lens traveling. In this traveling of the lens, a DC (Direct Current) motor, an ultrasonic wave motor (USM), or the like is used as an actuator to move the focusing lens in the interchangeable lens.

On the other hand, in the imager AF, since it is not known how fat to move the photographing lens at the start of lens traveling, this system needs to seek a final destination point of traveling of the photographing lens while moving the lens. Thus, the imager AF involves repetition of fine traveling of the photographing lens at predetermined pulse intervals. Therefore, in the imager AF, a stepping motor is best suited as the actuator to move the focusing lens in the interchangeable lens. However, the existing interchangeable lenses are designed to support the conventional TTL phase-difference AF, i.e., they are not optimized to move the focusing lens in the imager AF.

BRIEF SUMMARY OF THE INVENTION

The digital camera of the present invention has a camera body and a lens unit removably mounted on the camera body, in which the camera body calculates, based on information related to the lens unit, an optimum moving speed as an optimum speed for moving the lens unit upon causing the lens unit to perform focusing by an imager AF method (hill-climbing method).

For example, the digital camera of the present invention can be configured as a digital camera comprising a camera body and a lens unit removably mounted on the camera body, wherein the lens unit includes: a focusing lens moving in an optical axis direction to adjust the imaging position of a light beam from a subject; a lens moving part for moving the focusing lens based on a lens moving command sent from the camera body; a lens position detecting part for detecting the lens position of the focusing lens; and a lens memory for storing information related to the lens unit, the camera body includes: an image pickup device for capturing a light image formed through the lens unit and outputting an electric image signal; a synchronization signal generating part for generating a synchronization signal to decide on an imaging timing so as to cause the image pickup device to perform imaging at predetermined time intervals; a focus evaluation value calculating part for calculating a focus evaluation value as a value for evaluating the degree of focusing of the subject image based on the electric image signal output from the image pickup device in synchronization with the synchronization signal; a lens position acquiring part for acquiring the lens position of the focusing lens from the lens position detecting part in synchronization with the synchronization signal; and a control part for sending the lens moving command to the lens moving part to move the focusing lens to an in-focus position by a hill-climbing method based on the focus evaluation value calculated by the focus evaluation value calculating part and the lens position of the focusing lens acquired by the lens position acquiring part, and the control part has a lens moving speed calculating part for acquiring information related to the lens unit stored in the lens memory and calculating, based on the acquired information related to the lens unit, a speed at which the focusing lens is to be moved.

The digital camera of the present invention can also be understood as the invention of only the camera body side.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Preferred embodiments of the invention are described below with reference to the accompanying drawings.

First Embodiment

Figure 1:
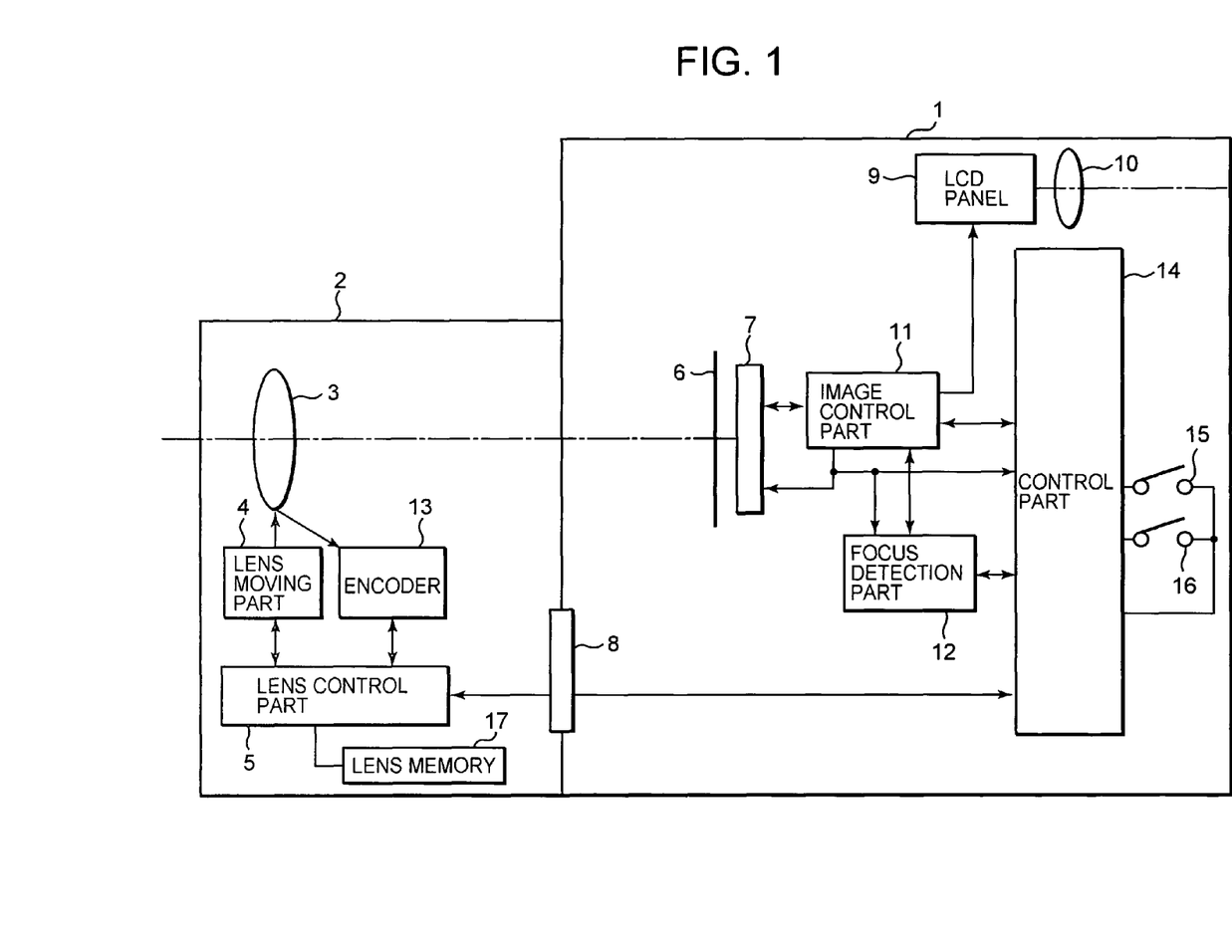
FIG. 1 is a block diagram showing the structure of a digital camera according to a first embodiment of the present invention.

FIG. 1 is a block diagram showing the structure of a digital camera according to a first embodiment. The digital camera has a camera body 1 and an interchangeable lens (lens unit) 2. This interchangeable lens 2 is an interchangeable lens designed to support TTL phase-difference AF. In other words, the interchangeable lens 2 is not a lens optimized for imager AF.

The interchangeable lens 2 includes a focusing lens 3, a lens moving part 4, a lens control part 5, an encoder 13, and a lens memory 17. The focusing lens 3 is part of the photographing lens and is used for focus adjustment. The lens moving part 4 is a member for moving the focusing lens 3 in the optical axis direction of the photographing lens by means of a DC motor (not shown). A detector (not shown) is incorporated in the lens moving part 4 to detect either end of the moving range of the focusing lens 3. The lens control part 5 is a member for communicating with a control part 14 provided in the camera body 1 and controlling the lens moving part 4. The encoder 13 generates an encoder signal along with the movement of the focusing lens 3. The lens memory 17 is a memory connected to the lens control part 5 to store information related to the interchangeable lens 2.

The camera body 1 has a shutter 6, an image pickup device 7, an LCD panel 9, a finder optical system 10, an image control part 11, a focus detection part 12, the control part 14, a first release switch (hereinafter referred to as "1R SW") 15, and a second release switch (hereinafter referred to as "2R SW").

The output signal of the image pickup device 7 is used for generation of image data and focus calculation. The LCD panel 9 is an LCD panel for an electronic viewfinder with a built-in backlight. The finder optical system 10 is a finder optical system for viewing the LCD panel 9.

The image control part 11 performs image processing on a picture signal output from the image pickup device 7, such as white balance processing, luminance processing, color matrix processing, etc., to form image data of a shot image and finder image data. In addition to the formation of these image data, the image control part 11 processes the picture signal output from the image pickup device 7 to acquire image information. The finder image data formed by the image control part 11 is sent to the LCD panel 9 and displayed on the LCD panel 9, allowing a user to view the finder image data through the finder optical system 10. On the other hand, the image data formed by the image control part 11 as the image data representing the shot image is recorded in a memory (not shown) or the like.

The image control part 11 also controls the driving of the image pickup device 7. In other words, the image control part 11 generates a drive control signal for the image pickup device 7 based on a reference clock, not shown, sent from the control part 14. For example, the image control part 11 generates clock signals, such as a timing signal for instructing integral start/stop (exposure start/stop), control signals (a horizontal synchronizing signal, a vertical synchronizing signal, a transfer signal, etc.) for controlling the reading of a light-receiving signal at each pixel in the image pickup device 7, etc., and outputs the clock signals to the image pickup device 7. The vertical synchronizing signal VD is also output to the focus detection part 12 and the control part 14.

The focus detection part 12 refers to the history of luminance signals acquired by the image control part 11 to calculate and output a focus evaluation value (hereinafter also referred to as "AF evaluation value") representing the degree of focusing. The focus detection area as an area used in calculating the AF evaluation value is predetermined.

The control part 14 controls each component in the camera body 1 and the interchangeable lens 2.

The 1R SW 15 is the first release switch that is turned on at the half-press of a release button (not shown) to start a focus detection operation to be described later. The 2R SW 16 is the second release switch that is turned on at the full-press of the release button (not shown) to start a shooting operation to be described later.

The control part 14 in the camera body 1 and the lens control part 5 in the interchangeable lens 2 are connected by a communication line through a lens contact portion 8. This lens contact portion 8 includes a plurality of contacts for supply of power to the lens, communication clock/data signals, etc. from the camera body 1 to the interchangeable lens 2.

Figure 2:
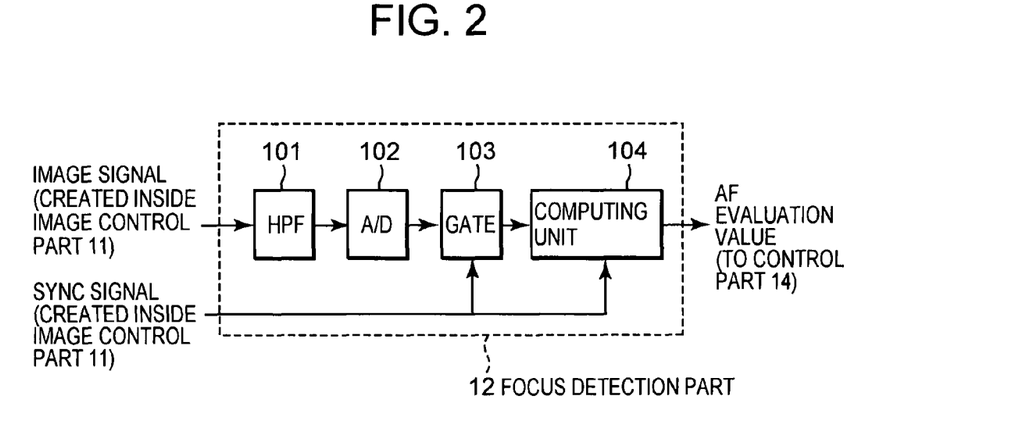
FIG. 2 is a block diagram showing the structure of a focus detection part.
Figure 3:
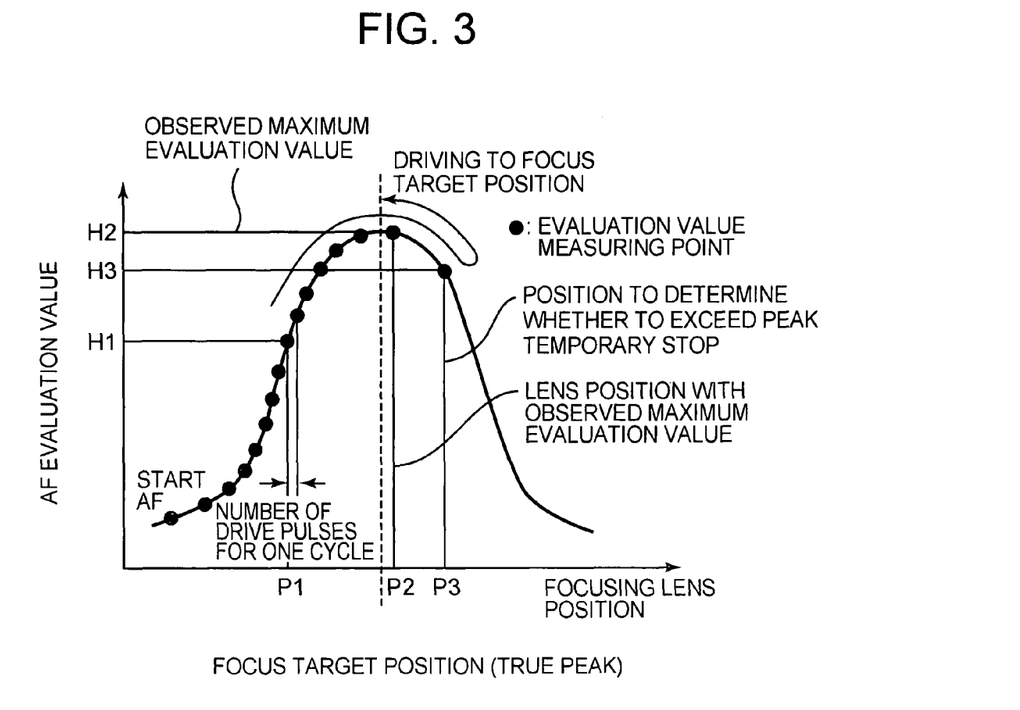
FIG. 3 is a graph showing a correlation between AF evaluation value and focusing lens position.

Referring next to FIGS. 2 and 3, imager AF in the first embodiment will be described. FIG. 2 is a block diagram showing the structure of the focus detection part 12. FIG. 3 is a graph showing a correlation between AF evaluation value and focusing lens position.

As shown in FIG. 2, circuit blocks for determining an AF evaluation value are provided inside the focus detection part 12. Specifically, inside the focus detection part 12, a high-pass filter (HPF) 101, an A/D converter 102, a focus detection area selecting gate 103, and a computing unit 104 are connected in this order.

Upon outputting a signal from the image control part 11 to the focus detection part 12, the output is made as follows: The image control part 11 outputs a luminance signal of generated image data to the HPF 101, and a synchronization signal to the focus detection area selecting gate 103, the computing unit 104, and the control part 14 in synchronization with the output of the luminance signal.

The following describes each component inside the focus detection part 12 along a flow of signal processing inside the focus detection part 12.

First, the HPF 101 extracts high frequency components contained in the luminance signal output from the image control part 11. The higher the sharpness of the image (the more the image is focused), the more the extracted high-frequency components are contained. Therefore, by integrating the high frequency components, the level of average image sharpness in an integral area can be converted into a numerical value. The sharpness level is also referred to as "AF evaluation value" below.

The high frequency components passing through the HPF 101 are converted by the A/D converter 102 into digital signals, and input into the focus detection area selecting gate 103. This focus detection area selecting gate 103 is a circuit for extracting only signals corresponding to a plurality of focus detection areas predetermined on the imaging screen. Therefore, the focus detection area selecting gate 103 extracts, from among the digital signals input from the A/D converter 102, only information on the subject cast on a selected one of the focus detection areas.

The selection of a focus detection area can be made by employing any of various methods. For example, among the plurality of focus detection areas, a focus detection area selected based on a certain selection algorithm (for example, such as to select the closest focus detection area) can be employed. Alternatively, a focus detection area can be selected by the user.

The digital signal extracted by the focus detection area selecting gate 103 is input into the computing unit 104. The computing unit 104 accumulates digital signals for one frame. This accumulated value is input into the control part 14 as the AF evaluation value representing the sharpness level of the image data.

Using the AF evaluation value thus calculated, the control part 14 performs imager AF as a known hill-climbing autofocus system. In other words, when performing imager AF, the control part 14 controls the lens moving part 4 through the lens control part 5 to operate the focusing lens 3 in a hill-climbing manner in order to acquire information on the focusing lens position, while it receives input of AF evaluation values from the computing unit 104 to obtain an AF evaluation curve as shown in FIG. 3. The AF evaluation curve is plotted, for example, from focusing lens positions (P1, H1), (P2, H2), (P3, H3), etc.

In performing the imager AF in this manner, if an AF evaluation value becomes lower by a certain amount than a peak value, the control part 14 determines that it exceeds the peak value and stops the movement of the focusing lens 3 at the time. Then, the control part 14 detects the focusing lens position (P2, H2) at which the AF evaluation value reaches the maximum value. Further, the control part 14 performs an interpolation calculation or the like from the plurality of AF evaluation values to determine, as a focus target position, a position of the focusing lens 3 at which the AF evaluation value becomes the peak value. Then, the control part 14 controls the lens moving part 4 through the lens control part 5 to move the focusing lens 3 to the focus target position.

Figure 4:
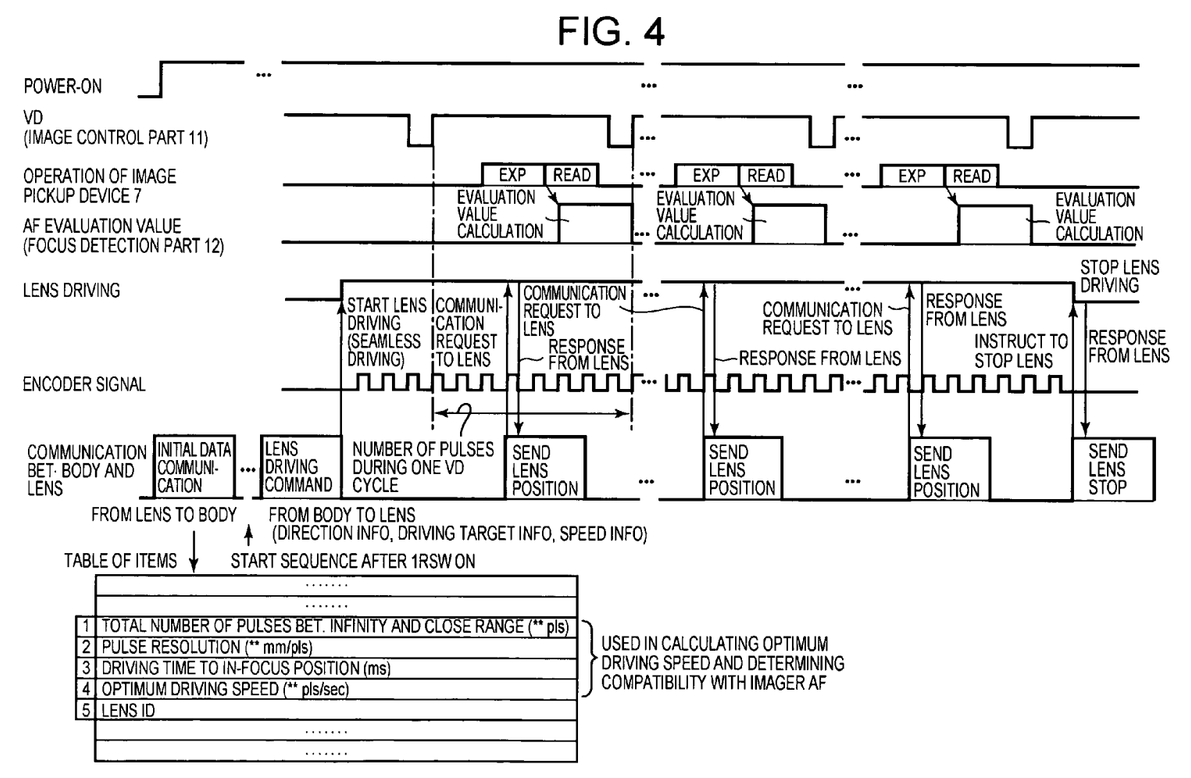
FIG. 4 is a timing chart of operation control of the digital camera according to the first embodiment of the present invention.

Referring next to a timing chart of FIG. 4 showing operation control in the digital camera according to the first embodiment, a sequence of imager AF will be described.

First, when a power switch (not shown) is turned on, the digital camera is powered on. After that, the lens control part 5 performs initial communication to transmit lens data to the control part 14 (initial data communication). The lens data transmitted in this initial data communication are data used for image AF determination. Specifically, the lens data include the total number of pulses (pls) necessary to move the focusing lens 3 in the interchangeable lens 2 from infinity to close range, pulse resolution (mm/pls), moving time (ms) to achieve focusing, optimum moving speed (pls/sec), lens ID data, and other various data used for exposure control and image processing. Here, the lens data stored in the lens memory 17 are not limited to those represented in the above units. For example, the pulse resolution can be a numeric value of moving distance per ten pulses represented in micrometers, and the moving time to achieve focusing can be a numeric value represented in microseconds. The details of data used for imager AF determination will be described later.

After that, when the user turns on the 1R SW 15, the control part 14 starts imager AF. In other words, the control part 14 sends a lens moving command for the focusing lens 3 to the lens control part 5 to start processing for moving the focusing lens 3.

The lens moving command is a certain command indicating an instruction given from the control part 14 to the lens control part 5, such as "moving for N pulses" or "moving N mm in terms of defocus amount in the optical axis direction" (where N is a numeric value, same below).

Further, the moving direction of the lens as the initial moving direction is the close-range direction when the focusing lens 3 is standing on the infinity side of an intermediate position between the infinity and close-range positions of the interchangeable lens 2, while it is the infinity direction when the focusing lens 3 is standing on the close-range side of the intermediate position.

If the AF evaluation value is decreased by moving the focusing lens 3 in these directions, the control part 14 detects the peak value of the AF evaluation curve and stops the movement of the focusing lens 3. After that, when restarting movement of the focusing lens 3, the moving direction is reversed (for simplicity of illustration, this processing for determining the initial moving direction is not shown in a flowchart of FIG. 5 to be described later).

Upon receiving the lens moving command from the control part 14, the lens control part 5 causes the lens moving part 4 to start moving the focusing lens 3. Further, the encoder 13 generates the encoder signal along with the movement of the focusing lens 3. The lens control part 5 counts signal pulses of the encoder signal generated by the encoder 13 to acquire the lens position of the focusing lens 3.

In the meantime, on the camera body 1 side, the image pickup device 7 is operated under the control of the image control part 11 in step with a predetermined timing of the vertical synchronizing signal (hereinafter abbreviated as "VD") generated by the image control part 11. Here, if the frame rate is 30 fps (30 frames per second), the VD cycle is 33.33 ms.

In other words, an exposure to the image pickup device 7 is made in step with the predetermined VD timing (indicated by EXP along the operation line of the image pickup device 7 in the timing chart of FIG. 4). After completion of the exposure, image data acquired by the image pickup device 7 is read by the image control part 11 (indicated by READ along the operation line of the image pickup device 7 in the timing chart of FIG. 4). The focus detection part 12 calculates an AF evaluation value from the image data in parallel with this reading operation.

The completion timing of calculation of the AF evaluation value is so preset that the calculation will be completed before the rising edge of the VD.

The lens moving operation under the control of the lens control part 5 is performed in parallel even during the above-mentioned sequence. In other words, when a certain lens-movement start command is send from the control part 14 to the lens control part 5, the lens control part 5 controls the movement of the focusing lens 3 for a number of encoder pulses in a direction as instructed by the control part 14. Such a lens moving method for performing imager AF by acquiring AF evaluation values in synchronization with the VD cycles while moving the focusing lens 3 is referred to as seamless movement below.

A major advantage of the seamless movement is that the time required to complete focusing can be reduced compared to the case of acquiring AF evaluation values by repeating start and stop of lens movement each time.

Here, upon receiving a seamless-movement start command from the control part 14, the lens control part 5 causes the lens moving part 4 to start moving the focusing lens 3. At this time, three pieces of information, namely moving speed information (N pls/sec) of the focusing lens 3, moving target position information (position of encoder signal N pls), and moving direction information (extension or retraction), are instructed to the lens control part 5 as the seamless movement command output from the control part 14.

The moving speed information is information for instructing the moving speed of the focusing lens 3 based on the data acquired in the initial data communication and used for imager AF determination. As for the moving target position, if the moving target position is set to either end, it can be set to the corresponding lens end (the infinity position when the focusing lens 3 is moved in the infinity direction or the close-range position when it is moved in the close-range direction). Then, if the control part 14 instructs to stop movement while the focusing lens 3 is moving, the focusing lens 3 is stopped at the position at the time.

Further, the control part 14 issues a predetermined communication command to the lens control part 5 at a substantially intermediate time point of the exposure (EXP) control period to send back lens position information on the current position of the focusing lens 3. In reply to the command, the lens control part 5 sends back the lens position information to the control part 14.

The reason for acquiring the lens position of the focusing lens 3 at the substantially intermediate time point of the exposure (EXP) control period is that the lens position of the focusing lens 3 at the time of exposure (EXP) is indispensable, and the lens position at the substantially intermediate time point of the exposure (EXP) control period is the optimum lens position as a representative of all lens positions during exposure.

When the peak value of the AF evaluation curve cannot be found even if the focusing lens 3 is moved to the lens end (the close-range end or the infinity end), or when the peak value is found before the focusing lens 3 reaches the lens end, the control part 14 instructs the lens control part 5 to stop the movement of the focusing lens 3.

After completion of the movement of the focusing lens 3, the lens control part 5 notifies the control part 14 of the completion. At this time, the lens control part 5 also notifies the control part 14 of the lens position of the focusing lens 3 at the time of completion of lens movement (e.g., the number of encoder pulses based on the lens infinity position). The number of drive pulses during one VD cycle as shown in FIG. 4 is closely related to focusing accuracy. The details will be described later with reference to the flowchart of FIG. 5.

Thus, by performing the sequence after the initial data communication (the sequence indicated between alternate long and short dash lines in FIG. 4), one combination of a lens position of the focusing lens 3 and an AF evaluation value as described with reference to FIG. 3 can be obtained. Therefore, by repeating the sequence, information on the lens position of the focusing lens 3 and the AF evaluation value can be obtained each time VD is input, thereby enabling the focusing lens 3 to reach the focus target position.

Referring next to the flowchart of FIG. 5, the imager AF sequence performed by the control part 14 in the digital camera according to the first embodiment will be described.

First, when the power switch (not shown) is turned on, the digital camera is powered on. After that, the lens control part 5 performs initial data communication (step S10). In other words, in step S10, the lens control part 5 transmits the above-mentioned various lens data to the control part 14.

Then, based on data used for imager AF determination to be described later among the lens data received in step S10, the moving speed of the focusing lens 3 is determined (step S11). In other words, it is determined in step S11 at which moving speed the focusing lens 3 in the interchangeable lens 2 should be moved to achieve high focusing accuracy of imager AF.

As the moving speed calculation method in step S11, there are methods (1) to (3) to be described in detail later. As mentioned above, various old and new interchangeable lenses can be used as the interchangeable lens 2, and most of the traditional interchangeable lenses are designed to support TTL phase-difference AF. Therefore, the lens moving speed varies from interchangeable lens to interchangeable lens. Although it is desirable that the lens moving speed is as fast as possible to reduce the time required to complete focusing, since too fast speed can reduce stopping accuracy (i.e., focusing accuracy), the lens moving speed is set to be as fast as in a range not to impair the stopping accuracy.

In the first embodiment, it is further required to set the lens moving speed of the focusing lens 3 in the interchangeable lens 2 to a lens moving speed suitable for seamless movement of the focusing lens 3 to perform imager AF. If the lens moving speed is too fast, there arises a problem that the focusing accuracy is degraded because of the increase in moving distance of the focusing lens 3 within one VD cycle. In addition, the lens moving speed set for an interchangeable lens designed to support TTL phase-difference AF may not to be the optimum lens moving speed for the digital camera according to the first embodiment. Therefore, it is necessary to optimize control of the lens moving speed for the digital camera according to the first embodiment. In view of these circumstances, such a lens moving speed of the focusing lens 3 that can achieve high focusing accuracy for imager AF is determined in step S11.

(1) Determination and Calculation from Pulse Resolution Data

It is required that the "number of drive pulses during one VD cycle" described with reference to FIG. 4 be equal to or more than a predetermined number of pulses. This is because the "number of drive pulses during one VD cycle" corresponds to the "interval between AF evaluation value points (on the abscissa)" as described with reference to FIG. 3, and if this interval is coarse (large), the calculation accuracy of the lens position of the focusing lens 3 when the AF evaluation value reaches the peak value becomes low. In other words, if the "number of drive pulses during one VD cycle" is less than a predetermined number of pulses, the focusing accuracy is lowered.

On the other hand, if the "interval between AF evaluation value points (on the abscissa)" is too short (i.e., if the moving speed of the focusing lens 3 is too slow), focusing takes too much time. Therefore, it is required that the "interval between AF-evaluation value points (on the abscissa)" be optimized to some extent.

For example, assuming that the final focusing accuracy is ±50 µm in terms of defocus amount in the optical axis direction (i.e., assuming that the amount of defocus within ±50 µm from the optical in-focus position is considered to be in focus), it is preferable that the focusing lens 3 be so moved that the travel of the focusing lens 3 during one 1VD cycle is about 200 µm, which is four times of 50 µm. If the focusing lens 3 is moved by such a distance each time, an interpolation calculation can be made for the focusing position of the focusing lens 3 accurately upon determining the lens position of the focusing lens 3 at which an AF evaluation value as the final in-focus position becomes the peak value.

First, in order to determine the number of drive pulses during one VD cycle, it is determined from the "pulse resolution" in the lens data how many pulses the defocus amount of 200 µm corresponds to. The "pulse resolution" is data indicating how many micrometers (µm) the amount of travel per pulse is in terms of defocus amount in the optical axis direction upon moving the focusing lens 3 at a certain speed.

Next, the moving speed (N pls/sec) of the focusing lens 3 to move the focusing lens 3 for the number of drive pulses during one VD cycle thus determined is determined. Here, since the control part 14 already knows one VD cycle (frame rate), it is easy to calculate the moving speed (N pls/sec) in order to move the focusing lens 3 for the number of drive pulses during one VD cycle.

If the pulse resolution value varies depending on the zoom position and/or the lens position of the focusing lens 3, pulse resolutions corresponding to respective zoom positions and pulse resolutions corresponding to respective lens positions of the focusing lens 3 can be acquired beforehand in step S10 to select the pulse resolution value used for calculation based on the current zoom position and the current lens position of the focusing lens 3. To acquire the current zoom position and the current lens position of the focusing lens 3, a lens communication command, for example, exclusively used for inquiring these values from the lens control part 5 can be provided.

(2) Determination from Lens ID Data

The control part 14 can refer to the lens ID data in the lens data received in step S10, i.e., data indicating the lens type of interchangeable lens 2 (e.g., 50-mm F1.4 lens, 50-200 mm F4-5.6 zoom lens, etc.) to determine the optimum moving speed of the focusing lens 3.

In this case, the optimum moving speed for application to imager AF can be determined for all interchangeable lenses commercially available on the market at the time of developing the camera body 1. Therefore, the control part 14 can determine the optimum moving speed of the focusing lens 3 based on the lens ID data. However, since this method cannot support interchangeable lenses developed after the development of the camera body 1, the above method (1) or the method (3) to be described below is used for these interchangeable lenses.

(3) Determination from Optimum Moving Speed Data

Optimum moving speed data indicating the optimum moving speed of the focusing lens 3 in case of application of the interchangeable lens 2 to imager AF can be included in advance as one of the lens data to support interchangeable lenses 2 developed after the development of the camera body 1. In such a case, the control part 14 can determine the optimum moving speed based on the optimum moving speed data.

Specifically, since interchangeable lenses 2 developed around the same time as or after the development of the camera body 1 can be designed to support imager AF, the optimum moving speed data can be stored in the lens memory 17 connected to the lens control part 5. With the traditional interchangeable lenses 2 already available on the market before the development of the camera body 1, the optimum moving speed data can be written into the lens memory 17 connected to the lens control part 5, for example, by updating the firmware of the lens control part 5 via a home page (Web).

Note that the optimum moving speed data can be moving speed data expressed, for example, in (N pls/sec), or flag-type data in which moving speeds are classified into several kinds of moving speeds in association with respective flags.

Figure 5:
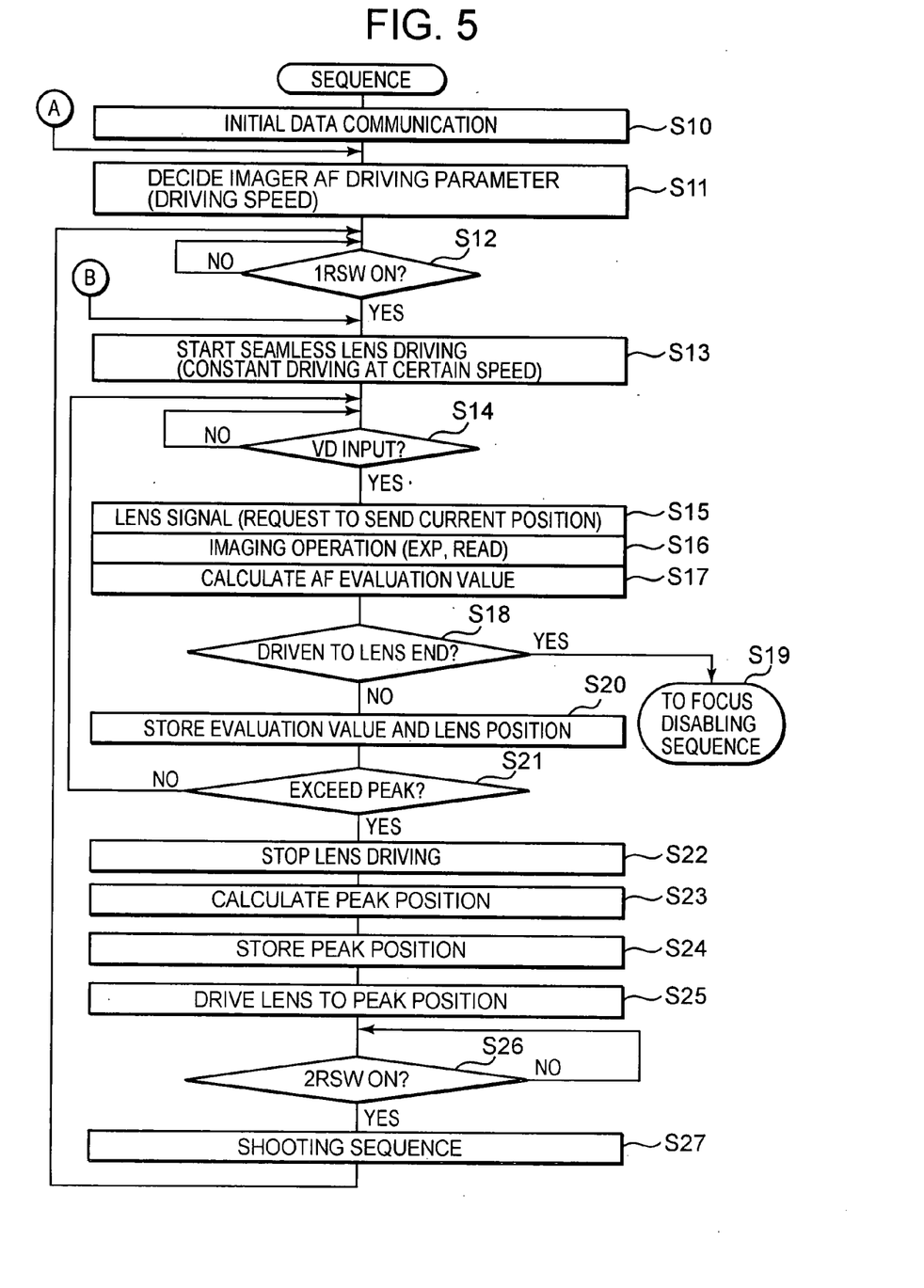
FIG. 5 is a flowchart showing an imager AF sequence performed by a control part in the digital camera according to the first embodiment of the present invention.

Returning to the flowchart of FIG. 5, after determining the lens moving speed of the focusing lens 3 in step S11, the control part 14 waits until the 1R SW 15 is turned on (i.e., until the start of moving the focusing lens 3 is instructed) (step S12).

If step S12 branches to YES, the control part 14 instructs the lens control part 5 to start moving the focusing lens 3 (step S13). In step S13, the predetermined command to start seamless movement at the lens moving speed determined in step S11 is transmitted to the lens control part 5. At this time, if the moving target position is either end, the lens end (the infinity position in case of moving in the infinity direction or the close-range position in case of moving in the close-range direction) can be set as the target position. Then, if the control part 14 instructs to stop movement while the focusing lens 3 is moving, the focusing lens 3 is stopped at the position at the time.

After completion of processing in step S13, the control part 14 determines whether the vertical synchronizing signal VD generated by the image control part 11 is input or not (step S14). If step S14 branches to NO, the procedure returns to step S14 again. In other words, in step S14, the control part 14 waits until the vertical synchronizing signal VD generated by the image control part 11 is input.

If step S14 branches to YES, the control part 14 issues, as described with reference to FIG. 4, the predetermined communication command to the lens control part 5 at a substantially intermediate time point of the exposure (EXP) control period to send back lens position information on the current position of the focusing lens 3 (step S15). In reply to the command, the lens control part 5 sends back the lens position information to the control part 14.

Then, the image pickup device 7 is driven to perform an imaging operation (step S16). Specifically, in step S16, if the shutter 6 is not open, it is first opened, and the image control part 11 causes an exposure to the image pickup device 7 (as indicated by EXP along the operation line of the image pickup device 7 in the timing chart of FIG. 4). After completion of the exposure, the image control part 11 reads image data from the image pickup device 7 (as indicated by READ along the operation line of the image pickup device 7 in the timing chart of FIG. 4). Then, the image control part 11 causes the LCD panel 9 to show the image data thus acquired. Further, the image control part 11 calculates an AF evaluation value in parallel with the reading of the image data (step S17).

Note that although steps S15 to S17 are illustrated in order of step number in the flowchart of FIG. 5, these steps S15 to S17 are executed in parallel.

Next, it is determined whether the focusing lens 3 has been moved to a lens end portion (either end of the moving range of the focusing lens 3) (step S18). In other words, it is determined in step S18 whether the focusing lens 3 is at the close-range end at the present moment after moving in the close-range direction or it is at the infinity end after moving in the infinity direction.

If step S18 branches to YES, since this is the case where no peak value of the AF evaluation curve cannot be found even though the focusing lens 3 has been moved to the lens end, focus disabling processing is performed (step S19). In step S19, a sequence of operations are executed to provide an indication on the LCD panel 9 informing the user that focusing is disabled and prepare for next shooting.

If step S18 branches to NO, the calculation result of AF evaluation value acquired in step S17 and the lens position data acquired in step S15 are stored in a certain memory (not shown) (step S20).

It is then determined whether the position of the focusing lens 3 exceeds the lens position at which the AF evaluation value becomes the peak value (step S21). If step S21 branches to NO, since it means that the peak value of the AF evaluation curve has not been found yet, the procedure returns to step S14.

If step S21 branches to YES, since it means that the peak value of the AF evaluation curve has been found, the control part 14 instructs the lens control part 5 to stop lens movement (step S22). Then, the control part 14 reads the lens position (P2, H2) of the focusing lens 3 at which the AF evaluation value reaches the maximum value and detection results of neighboring points (AF evaluation values and lens positions) from the memory not shown) as described with reference to FIG. 3 to calculate, as a focus target position, a lens position of the focusing lens 3 at which the AF evaluation value becomes a true peak value determined by an interpolation calculation or the like (step S23).

The calculation result in step S23 is recorded in the memory (not shown) (step S24). Further, the focusing lens 3 is moved to the focus target position determined in step S23 (step S25).

After that, the control part 14 waits until the 2R SW 16 is turned on (i.e., until the start of shooting operation is instructed) (step S26). In step S26, when determining that the 2R SW is turned on (the start of shooting operation is instructed), the control part 14 starts a predetermined shooting sequence (step S27), and after completion of the shooting sequence, it returns to step S12 to wait ready for next shooting.

As described above, according to the first embodiment of the present invention, there can be provided a digital camera capable of securing high focusing accuracy and reducing the focusing time upon performing imager AF using an interchangeable lens designed to support TTL phase-difference AF.

[Modification]

In the first embodiment, the lens moving speed is determined from the pulse resolution (N mm/pls). However, an average lens moving speed can also be calculated from two kinds of information: one is the moving time between infinity and close range upon moving the focusing lens 3 at a constant lens moving speed, and the other is a defocus amount between infinity and close range (e.g., a defocus amount in the optical axis direction upon viewing a close-range subject on condition that the focusing lens 3 is at the infinity position). Therefore, for example, when the focusing lens 3 is moved by a defocus amount of 200 μm during one VD cycle, it can be determined based on this calculation result whether the lens moving speed should be further increased or decreased. Further, the pulse resolution (N mm/pls) can be estimated from two kinds of information: one is the total number of pulses (N pls) between infinity and close range, and the other is a defocus amount across the interval between infinity and close range.

In addition, the method of determining the lens moving speed of the focusing lens 3 is not limited to the above-mentioned methods (1) to (3), and any other method can be employed as long as it can estimate the optimum lens moving speed upon performing imager AF.

Second Embodiment

A digital camera according to a second embodiment of the present invention will next be described. The following mainly describes differences between the digital camera of the first embodiment and the digital camera of the second embodiment.

Among the interchangeable lenses designed to support TTL phase-difference AF, there are interchangeable lenses that require a long time to complete focusing. The digital camera according to the second embodiment is proposed in view of such circumstances. In other words, the digital camera according to the second embodiment not only has the same effects as those of the first embodiment, but also it can reduce the time required to complete focusing and secure focusing accuracy even in case of using such an interchangeable lens that requires a long time to complete focusing.

Figure 6A:
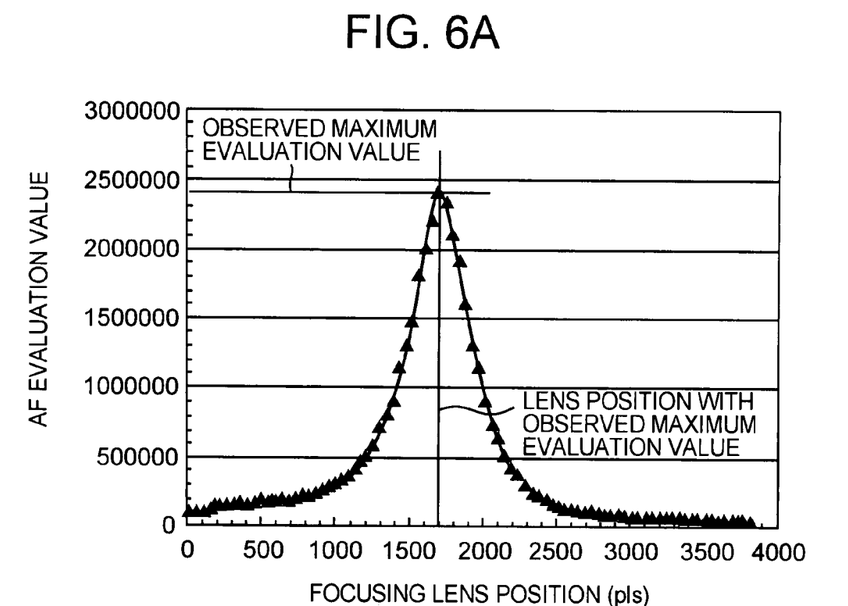
FIG. 6A is a graph of an AF evaluation value characteristic in case of acquiring AF evaluation values at dense intervals because the lens moving speed of the focusing lens is slow.
Figure 6B:
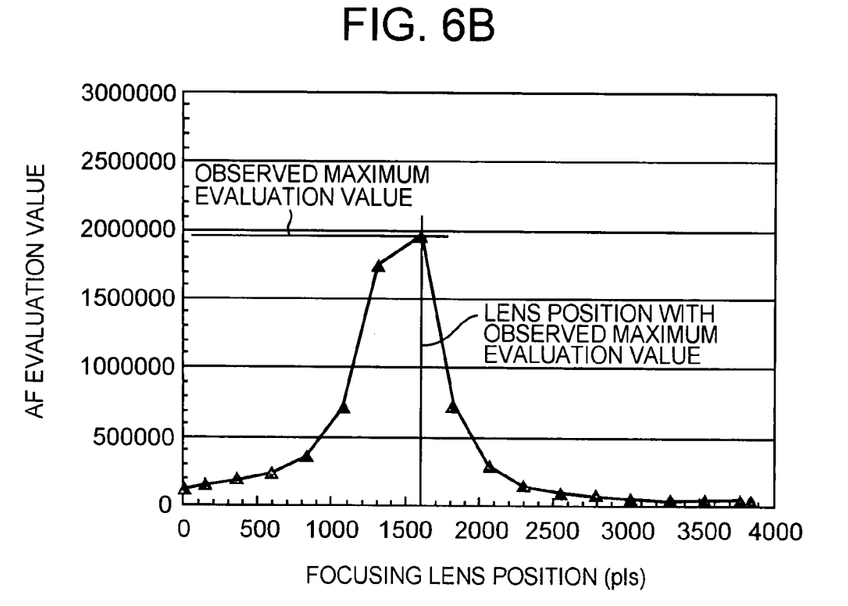
FIG. 6B is a graph of an AF evaluation value characteristic in case that the lens moving speed of the focusing lens is fast compared to the case shown in FIG. 6A.

FIGS. 6A and 6B are graphs showing examples of AF evaluation value characteristics upon changing the moving speed under the same conditions except the moving speed. In other words, like the graph in FIG. 3, the graphs in FIGS. 6A and 6B show a correlation between AF evaluation value and focusing lens position.

Here, the graph in FIG. 6A shows an AF evaluation value characteristic in case of acquiring AF evaluation values at dense intervals because the lens moving speed of the focusing lens is slow. On the other hand, the graph in FIG. 6B shows an AF evaluation value characteristic in case that the lens moving speed of the focusing lens 3 is fast compared to the case shown in FIGS. 6A and AF evaluation values are acquired at such intervals that the interval is not as dense as in FIG. 6A. The conditions other than the lens moving speed of the focusing lens 3, such as subject conditions, etc., are exactly the same between FIG. 6A and FIG. 6B.

As can be seen from the graphs in FIGS. 6A and 6B, the interval between lens positions of the focusing lens 3 at which AF evaluation values are acquired, respectively, becomes sparser as the lens moving speed of the focusing lens 3 increases. In this case, of course, the number of acquired AF evaluation values decreases. Therefore, the lens position (determined from an interpolation calculation or the like as mentioned above,) at which the AF evaluation value becomes the peak value deviates toward the infinity side or the close-range side.

As mentioned above, assuming that the final focusing accuracy is ±50 μm in terms of defocus amount in the optical axis direction (i.e., assuming that the amount of defocus within ±50 μm from the optical in-focus position is considered to be in focus), it is preferable that the focusing lens 3 be moved at intervals of about 200 μm, which is four times of 50 μm.

Therefore, the optimum moving speed of the focusing lens 3 is determined from this moving interval. In case of moving at this optimum moving speed, as described step S25 in the flowchart of FIG. 5 according to the first embodiment, the focusing lens 3 can be moved at a time to the lens position (determined from an interpolation calculation or the like as mentioned above) at which the AF evaluation value becomes the peak value, thereby securing focusing accuracy.

However, if the moving speed of the focusing lens 3 is increased as shown in FIG. 6B, since the lens position of the focusing lens 3 largely deviates from the lens position at which the AF evaluation value becomes the peak value as mentioned above, the digital camera according to the first embodiment may not be able to secure certain focusing accuracy.

In view of such circumstances, according to the second embodiment, the time required to complete focusing is first estimated based on various lens data received from an interchangeable lens 2 mounted-on the camera body 1 on condition that imager AF is performed with seamless movement of the interchangeable lens 2 according to the first embodiment to change the moving speed of the focusing lens 3.

In other words, considering the degradation of focusing accuracy due to an increase in moving speed of the focusing lens 3, a lens position of the focusing lens 3 at which the AF evaluation value reaches its peak value in such a state that the focusing lens 3 is moving at a fast moving speed (i.e., a lens position at which the AF evaluation value reaches a rough peak value) is determined, and the focusing lens 3 is once moved to the lens position. After that, the focusing lens 3 is moved at the optimum moving speed to determine a lens position at which the AF evaluation value becomes the true peak value in the same manner as in the first embodiment, and the moving lens 3 is moved to the lens position, thereby securing certain focusing accuracy.

Referring to a flowchart shown in FIG. 7, imager AF sequence performed by the control part 14 in the digital camera according to the second embodiment will be described below. Note that the same operation control steps as those in the flowchart of FIG. 5 are mentioned as such in the following description for the sake of omitting the description thereof in an appropriate manner.

First, when the power switch (not shown) is turned on, the digital camera is powered on. After that, the lens control part 5 performs initial data communication (i.e., the lens control part 5 transmits various lens data to the control part 14) (step S30). Step S30 is the same operation control step as step S10 in the flowchart of FIG. 5.

Then, based on data used for imager AF determination to be described later among the lens data received in step S30, the moving speed of the focusing lens 3 is determined, and the time required to move the focusing lens 3 between infinity and close range at the determined moving speed (i.e., the maximum amount of time required for the maximum stroke) is estimated (step S31).

In step S31, for example, the required time is estimated by any of methods as mentioned below.

(1) Determination from Total Number of Pulses

As described in the first embodiment with reference to the flowchart of FIG. 5, the number of drive pulses during one VD cycle is determined to calculate the moving speed of the focusing lens 3. Here, since the time period during one VD cycle corresponds to the frame rate, the amount of time required to perform imager AF by moving the focusing lens 3 from infinity to close range can be estimated based on the number of drive pulses during one VD cycle and the "total number of pulses between infinity and close range."

(2) Determination from Lens ID Data

Like in the first embodiment, the lens ID data in the lens data, i.e., data indicating the type of interchangeable lens 2 can be referred to in order to determine the optimum moving speed of the focusing lens 3.

In this case, the optimum moving speed for application to imager AF can be determined for all interchangeable lenses commercially available on the market at the time of developing the camera body 1. Therefore, the control part 14 can determine the optimum moving speed of the focusing lens 3 based on the lens ID data. However, since this method cannot support interchangeable lenses developed after the development of the camera body 1, the above method (1) or a method (3) to be described below is used for these interchangeable lenses.

(3) Determination from Data Indicating Moving Time Required to Complete Focusing Interchangeable lenses 2 developed around the same time as or after the development of the camera body 1 can hold data on the moving time of the focusing lens 3 required to complete focusing in case of application of imager AF to the full stroke between infinity and close range (hereinafter referred to as "moving time data") as one of the lens data. In such a case, the control part 14 has only to refer to the moving time data. Specifically, with the interchangeable lenses 2 developed around the same time as or after the development of the camera body 1, the moving time data is stored in the lens memory 17 connected to the lens control part 5 provided in the interchangeable lens 2 concerned. The moving time data can be data expressed in (N msec), or flag-type data in which moving speeds are classified into several kinds of moving speeds in association with respective flags.

Further, with the traditional lenses already available on the market before the development of the camera body 1, the moving time data can be written into the memory in the lens control part 5 provided inside the interchangeable lens 2 by updating the firmware of the lens control part 5 via a home page (Web).

The method used in step S31 to estimate the time required to move the focusing lens 3 from infinity to close range (i.e., the maximum amount of time required for the maximum stroke) is not limited to any one of the above-mentioned methods (1) to (3), and any other method can be employed as long as it can estimate the time required to complete focusing upon performing imager AF.

The time required to complete focusing can also be estimated on the assumption that imager AF is applied to a stroke which is long but not full between infinity and close range of the interchangeable lens 2.

Figure 7:
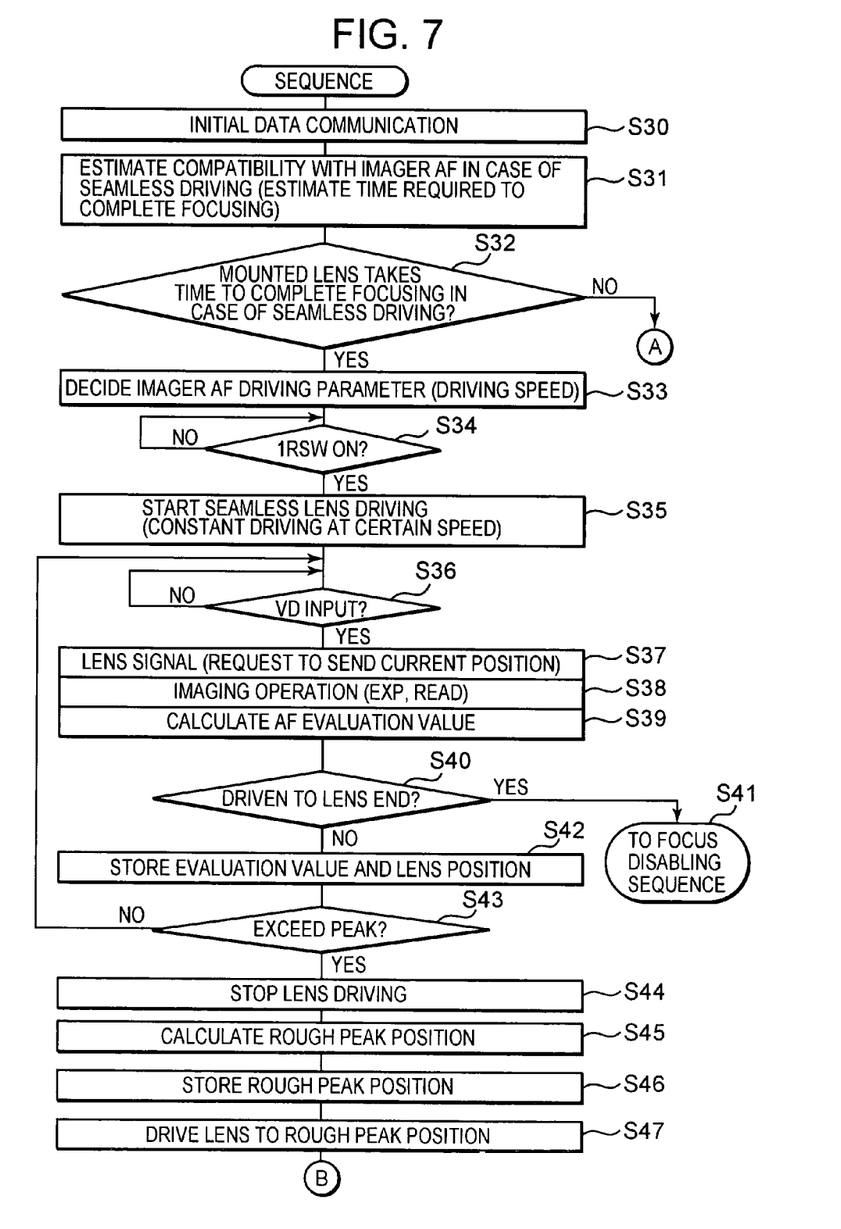
FIG. 7 is a flowchart showing an imager AF sequence performed by a control part in a digital camera according to a second embodiment of the present invention.

Returning to the flowchart of FIG. 7, if the imager AF is performed by referring to the estimation result in step S31, it is determined whether the time required to complete focusing is equal to or more than a predetermined time (e.g., whether it takes two seconds or more) (step S32). With this example of determination criterion, if it takes two seconds to complete focusing in the phase-difference AF system, it can be generally said that focusing is too slow. However, considering the fact that the interchangeable lens 2 is not designed to support imager AF and two seconds is the maximum time required to perform imager AF at the full stroke between infinity and close range, it can be said that two seconds is not so slow.

If step S32 branches to NO, the procedure shifts to step S11 in the flowchart of FIG. 5 to perform the sequence of operations starting at step S11. In other words, if the time required to complete focusing upon performing imager AF is not so long, the sequence of imager AF in the first embodiment is performed.

On the other hand, if step S32 branches to YES, such a moving speed of the focusing lens 3 that can complete focusing in about two seconds is estimated by the method, described in step S11 and step S31 to increase the moving speed of the focusing lens 3 (step S33).

Then, the control part 14 waits until the 1R SW 15 is turned on (i.e., until the start of moving the focusing lens 3 is instructed) (step S34).

When the 1R SW 15 is turned on, the control part 14 instructs the lens control part 5 to start moving the focusing lens 3 at the moving speed determined in step S33 (step S35).

The following steps S36 to S44 are the same operation control steps as steps S14 to S22 in the flowchart of FIG. 5, respectively.

After the lens control part 5 is instructed to stop the lens in step S44, a lens position of the focusing lens 3 at which the AF evaluation value becomes the peak value is determined in the same manner as in step S23 in the flowchart of FIG. 5 (step S45). Note that, since the moving speed of the focusing lens 3 is increased as mentioned above, the lens position determined in step S45 is a lens position at which the AF evaluation value becomes a rough peak value as described with reference to FIG. 6B.

Then, the calculation result in step S45 is recorded in the memory (not shown) (step S46). Further, the focusing lens 3 is moved to the lens position determined in step S45 (step S47), and the procedure shifts to step S13 in the flowchart of FIG. 5. After that, the above-mentioned sequence shown in the flowchart of FIG. 5 is executed to move the focusing lens 3 at such a normal speed that can achieve high focusing accuracy for imager AF in order to search for the lens position of the focusing lens 3 at which the AF evaluation value becomes the true peak value.

As described above, according to the second embodiment of the present invention, there can be provided a digital camera capable of securing high focusing accuracy and reducing the focusing time upon performing imager AF using an interchangeable lens designed to support TTL phase-difference AF.

Specifically, according to the digital camera of the second embodiment, the time required to complete focusing upon performing imager AF with seamless movement of the interchangeable lens 2 as in the first embodiment is estimated based on the lens data. Then, only when it is determined as a result of estimation that the time required to complete focusing is equal to or more than the predetermined amount of time, the moving speed of the focusing lens 3 is temporarily increased to find a lens position of the focusing lens 3 at which the AF evaluation value becomes a rough peak value in order to move the focusing lens 3 to the lens position. After that, imager AF is performed with seamless movement as in the first embodiment to move the focusing lens 3 at the optimum moving speed. This enables the movement of the focusing lens 3 to the lens position at which the AF evaluation value becomes the true peak value. In other words, according to the digital camera of the second embodiment, even if the compatibility of the interchangeable lens 2 with imager AF is not so good, not only can the time required to complete focusing be reduced, but also the same focusing accuracy as the digital camera according to the first embodiment can be secured.

Each of the components described in the aforementioned first and second embodiments can also be referred to as follows. The encoder 13 can be referred to as a lens position detecting part because it detects the lens position of the focusing lens 3. The image control part 11 can be referred to as a synchronization signal generating part because it generates a synchronization signal for deciding on imaging timing to cause image pickup device 7 to perform imaging at predetermined time intervals. The focus detection part 12 can be referred to as a focus evaluation value calculating part because it calculates a focus evaluation value as a value for evaluating the degree of focus on a subject based on an electric signal acquired by the image pickup device 7 in synchronization with the synchronization signal. The control part 14 can be referred to as a lens position acquiring part because it acquires the lens position of the focusing lens 3 from the encoder 13 in synchronization with the synchronization signal.

The control part 14 also has functions to acquire information related to the interchangeable lens 2 as the lens unit stored in the lens memory 17, and to calculate, based on the information related to the lens unit, the optimum moving speed of the focusing lens 3 for moving the focusing lens 3 to the in-focus position by a hill-climbing method using the interchangeable lens 2. Since the part for performing the functions can be referred to as a lens moving speed calculating part, it can be said that the control part 14 includes the lens moving speed calculating part.

In another aspect of the present invention, the control part 14 has functions to acquire information related to the interchangeable lens 2 as the lens unit stored in the lens memory 17, and to calculate an estimated time required to complete focusing based on the information related to the interchangeable lens 2 to determine whether the estimated, required time is equal to or more than a predetermined time. Since the part for performing the functions can be referred to as a determination part, it can be said that the control part 14 includes the determination part.

The control part 14 further has a function to control the movement of the focusing lens 3 in a second mode for moving the focusing lens 3 at a second speed when the determination part determines that the estimated, required time is equal to or more than the predetermined time, or in a first mode for moving the focusing lens 3 at a first speed slower than the second speed when the determination part determines that the estimated, required time is not equal to or more than the predetermined time. Since the part for performing the function can be referred to as a speed control part, it can be said that the control part 14 includes the speed control part.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera comprising:
a camera body; and
a lens unit removably mounted on the camera body,
wherein the lens unit includes:
a focusing lens moving in an optical axis direction to adjust an imaging position of a light beam from a subject;
a lens moving part for moving the focusing lens based on a lens moving command sent from the camera body;
a lens position detecting part for detecting a lens position of the focusing lens; and
a lens memory for storing information related to the lens unit, the camera body includes:
an image pickup device for capturing a light image formed through the lens unit and outputting an electric image signal;
a synchronization signal generating part for generating a synchronization signal to decide on an imaging timing so as to the image pickup device to perform imaging at a predetermined time interval;
a focus evaluation value calculating part for calculating a focus evaluation value as a value for evaluating the degree of focusing of the subject image based on the electric image signal output from the image pickup device in synchronization with the synchronization signal;
a lens position acquiring part for acquiring the lens position of the focusing lens from the lens position detecting part in synchronization with the synchronization signal; and
a control part for sending the lens moving command to the lens moving part to move the focusing lens to an in-focus position by a hill-climbing method based on the focus evaluation value calculated by the focus evaluation value calculating part and the lens position of the focusing lens acquired by the lens position acquiring part, and
the control part has
a determination part for acquiring information related to the lens unit stored in the lens memory, and calculating an estimated time required to complete focusing based on the acquired information related to the lens unit to determine whether the estimated, required time is equal to or more than a predetermined time, and
a speed control part for controlling movement of the focusing lens in a second mode for moving the focusing lens at a second speed when the determination part determines that the estimated, required time is equal to or more than the predetermined time, or in a first mode for moving the focusing lens at a first speed slower than the second speed when the determination part determines that the estimated, required time is less than the predetermined time.

2. The digital camera according to claim 1, wherein the information related to the lens unit stored in the lens memory is at least any one of information representing a moving distance of the focusing lens per unit time, information representing a moving distance of the focusing lens per predetermined number of drive pulses for moving the focusing lens, a number of drive pulses necessary to move the focusing lens from a close-range in-focus position to an infinity in-focus position, and information for identifying a type of lens unit.

3. The digital camera according to claim 1, wherein the lens unit is a lens unit designed to be mounted on a camera body having a phase-difference type automatic focusing function.

4. The digital camera according to claim 1, wherein when the determination part determines that the estimated, required time is equal to or more than the predetermined time, the speed control part controls the movement of the focusing lens in the second mode to detect a maximum focus evaluation value, and after detecting the maximum focus evaluation value in the second mode, the speed control part controls the movement of the focusing lens in the first mode to move the focusing lens to an in-focus position.

5. A digital camera on which a lens unit is removably mounted, the lens unit including a focusing lens for adjusting a focusing position and a lens memory for storing information related to the lens unit, the digital camera comprising:
an image pickup device for capturing a light image formed through the lens unit and outputting an electric image signal;
a synchronization signal generating part for generating a synchronization signal to decide on an imaging timing so as to cause the image pickup device to perform imaging at a predetermined time interval;
a focus evaluation value calculating part for calculating a focus evaluation value as a value for evaluating the degree of focusing of the subject image based on the electric image signal output from the image pickup device in synchronization with the synchronization signal;
a lens position acquiring part for acquiring a lens position of the focusing lens in synchronization with the synchronization signal; and
a control part for sending a lens moving command to a lens moving part in the lens unit to move the focusing lens to an in-focus position by a hill-climbing method based on the focus evaluation value calculated by the focus evaluation value calculating part and the lens position of the focusing lens acquired by the lens position acquiring part,
wherein the control part has
a determination part for acquiring information related to the lens unit stored in the lens memory, and calculating an estimated time required to complete focusing based on the acquired information related to the lens unit to determine whether the estimated, required time is equal to or more than a predetermined time, and
a speed control part for controlling movement of the focusing lens by switching between a first mode for moving the focusing lens at a first speed and a second mode for moving the focusing lens at a second speed faster than the first speed, such that
when the determination part determines that the estimated, required time is equal to or more than the predetermined time, the speed control part controls the movement of the focusing lens in the second mode, while when the determination part determines that the estimated, required time is less than the predetermined time, the speed control part controls the movement of the focusing lens in the first mode.

6. The digital camera according to claim 5, wherein the information related to the lens unit stored in the lens memory is at least any one of information representing a moving distance of the focusing lens per unit time, information representing a moving distance of the focusing lens per predetermined number of drive pulses for moving the focusing lens, a number of drive pulses necessary to move the focusing lens from a close-range in-focus position to an infinity in-focus position, and information for identifying a type of lens unit.

7. The digital camera according to claim 5, wherein when the determination part determines that the estimated, required time is equal to or more than the predetermined time, the speed control part controls the movement of the focusing lens in the second mode to detect a maximum focus evaluation value, and after detecting the maximum focus evaluation value in the second mode, the speed control part controls the movement of the focusing lens in the first mode to move the focusing lens to an in-focus position.

8. A method for focusing to a subject image, in a digital camera having a camera body and a lens unit detachably mounted on the camera body, by moving a focusing lens within the lens unit in the direction of the optical axis, the method comprising the following operations of the digital camera:

reading out information related to the lens unit stored within the lens unit;

causing an image pickup device which capture a light image formed through the lens unit and output an electric image signal, to capture an image repeatedly in a predetermined time interval, reading out the position of the focusing lens from the lens unit in synchronization with the repeated image capturing;

calculating an estimated time required to complete focusing based on the information related to the lens unit read from the lens unit, and determining whether the estimated time is equal to or more than a predetermined time;

sending an instruction signal to the lens unit so that the lens unit moves to the in-focus position by a hill-climbing method at first speed when the estimated time is determined to be equal to or more than the predetermined time, and sending an instruction signal to the lens unit so that the lens unit moves to the in-focus position by a hill-climbing method at second speed slower than the first speed when the estimated time is determined to be less than the predetermined time.

* * * * *